United States Patent
Bisti

(10) Patent No.: US 11,064,173 B2
(45) Date of Patent: Jul. 13, 2021

(54) PHOTOGRAPHIC DIRECTIONAL LIGHT REFERENCE FOR ARTICULATING DEVICES

(71) Applicant: International Business Machines Corporation, Armonk, NY (US)

(72) Inventor: Jeffrey Bisti, New Paltz, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 284 days.

(21) Appl. No.: 15/841,824

(22) Filed: Dec. 14, 2017

(65) Prior Publication Data

US 2019/0191137 A1 Jun. 20, 2019

(51) Int. Cl.
| | |
|---|---|
| *H04N 7/18* | (2006.01) |
| *H04N 9/73* | (2006.01) |
| *H04N 5/232* | (2006.01) |
| *H04N 5/235* | (2006.01) |
| *H04N 9/04* | (2006.01) |

(52) U.S. Cl.
CPC ............... *H04N 9/73* (2013.01); *H04N 5/232* (2013.01); *H04N 5/2351* (2013.01); *H04N 5/2353* (2013.01); *H04N 9/045* (2013.01); *H04N 9/735* (2013.01); *G05B 2219/45083* (2013.01)

(58) Field of Classification Search
CPC ........ H04N 9/73; H04N 5/232; H04N 5/2351; H04N 5/2353; H04N 9/045; H04N 9/735; G05B 2219/45083
USPC .............................. 348/64, 222.1, 223.2, 364
See application file for complete search history.

(56) References Cited

U.S. PATENT DOCUMENTS

| | | | |
|---|---|---|---|
| 7,265,337 B2 | 9/2007 | Doe | |
| 7,327,388 B2 | 2/2008 | Andersen | |
| 7,573,505 B2 | 8/2009 | Kawaguchi et al. | |
| 8,233,785 B1* | 7/2012 | Surma | G03D 15/005 396/1 |
| 8,824,791 B2 | 9/2014 | Brown et al. | |
| 9,275,284 B2 | 3/2016 | Gurbuz | |
| 9,602,735 B2* | 3/2017 | Spielberg | H04N 5/2351 |
| 9,696,424 B2 | 7/2017 | Galera et al. | |
| 9,769,457 B1* | 9/2017 | Myers | H04N 13/257 |
| 2004/0169735 A1 | 9/2004 | Andersen | |
| 2005/0231628 A1 | 10/2005 | Kawaguchi et al. | |
| 2006/0000966 A1 | 1/2006 | Doe | |

(Continued)

OTHER PUBLICATIONS

Auto Exposure Bracketing (AEB) by Camera Model "Auto Exposure Bracketing Settings by Camera Model", retruewed atl_ https://www.hdrsoft.com/resources/aeb.html; downloaded May 22, 2020; 18 pgs.

(Continued)

*Primary Examiner* — Jayanti K Patel
*Assistant Examiner* — Richard B Carter
(74) *Attorney, Agent, or Firm* — Cantor Colburn LLP; Teddi Maranzano

(57) ABSTRACT

Articulating devices and processes for obtaining photographic images with the articulating device generally include providing the articulating device with a directional light reference for use in photographically obtaining an accurate rendition of a subject being photographed. In this manner, an incidental light reference at the subject location is provided prior to capturing an image of the subject.

7 Claims, 1 Drawing Sheet

(56) References Cited

U.S. PATENT DOCUMENTS

| | | | |
|---|---|---|---|
| 2006/0158529 A1* | 7/2006 | Katagiri | H04N 5/2355 348/222.1 |
| 2012/0274805 A1 | 11/2012 | Brown et al. | |
| 2013/0113957 A1* | 5/2013 | Hamada | H04N 5/2351 348/223.1 |
| 2015/0015774 A1* | 1/2015 | Sugie | H04N 5/2353 348/364 |
| 2015/0317520 A1 | 11/2015 | Gurbuz | |
| 2015/0331107 A1 | 11/2015 | Galera et al. | |
| 2016/0320834 A1 | 11/2016 | Lee et al. | |
| 2017/0094130 A1 | 3/2017 | Kishi | |

OTHER PUBLICATIONS cambridgeincolour.com "Tutorials: White Balance", retrieved at: https://www.cambridgeincolour.com/tutorials/white-balance.htm; downloaded May 22, 2020; 10 pgs.

Hannemyr, Gisle "White Does Your Meter Meter? Exposure, Calibration and the K Factor", retrieved at: http://dpanswers.com/content/tech_kfactor.php; downloaded May 22, 2020; 5 pgs.

Mansouri, Alamin et al., "Image and Signal Processing" 7th International Conference, ICISP 2016, Trois-Rivières, QC, Canada, May 30-Jun. 1, 2016, Proceedings; retrieved at: https://www.springer.com/gp/book/9783319336176; 9 pgs.

Rowse, Darren "Get your White Balance Right in Seconds Using Grey Card" retrieved at: https://digital-photography-school.com/get-your-white-balance-right-in-seconds-using-grey-card/; downloaded May 22, 2020; 11 pgs.

Vuong, Quoc Kien et al., "A New Auto Exposure and Auto White-Balance Algorithm to Detect High Dynamic Range Conditions Using CMOS Technology", Proceedings of the World Congress on Engineering and Computer Science 2008; WCECS 2008, Oct. 22-24, 2008, 5 pgs.

Bisti, Jeffrey., " Photographic Directional Light Reference for Articulating Devices", U.S. Appl. No. 17/128,966, filed Dec. 21, 2020.

List of IBM Patents or Patent Applications Treated as Related; Date Filed: Jan. 11, 2021, 2 pages.

* cited by examiner

PHOTOGRAPHIC DIRECTIONAL LIGHT REFERENCE FOR ARTICULATING DEVICES

BACKGROUND

The present invention generally relates to articulating devices and processes for obtaining photographic images with the articulating device. More particularly, the present invention is directed to providing the articulating device with a directional light reference for use in obtaining the photographic images.

There is a growing demand for articulating devices capable of providing services easily to a participant. It is expected that articulating devices, e.g., interactive robots, will be able to work in our world, rather than us having to adapt to them. As one can imagine, being able to accurately capture and process photographic images is important for enabling many of these features, not only for getting around, but for documenting events, taking group photos, generating social media content, and performing facial recognition. However, the digital cameras currently utilized with articulating devices generally lack the level of detail and dynamic range associated with the human eye.

Hardware aside, we also take for granted just how much cognitive processing is done with the human mind to parse and interpret image data, which is why even some of the most expensive robots still struggle to make sense of, for example, a backlit subject, an array of bright pin-point LED lights, or with figuring out how to interpret an object standing in front of an electronic display with a moving picture.

SUMMARY

Embodiments of the present invention are directed articulating devices and processes for obtaining a directional light reference using the articulated devices for photography. In one or more embodiments, a process for taking a photographic image of a subject includes articulating at least one articulable appendage coupled to a main body of the articulating device to a subject location, wherein the at least one articulable appendage includes a flat planar surface having thereon a directional light reference, and wherein the directional light reference is at about the subject location; focusing on a predefined area of the directional light reference with a camera in the main body of the articulating device; adjusting an exposure value within a predetermined range to obtain a desired exposure value; obtaining an image of the predefined area of the directional light reference at the desired exposure value; processing the image of the predefined area of the directional light reference to obtain white balance information at the subject location; capturing an image of a subject at the subject location using the desired exposure value; and processing the captured image with the white balance information to obtain the photographic image of the subject.

In one or more embodiments, a process for obtaining white balance information for photography using an articulated device includes providing a directional light reference on a planar surface of an articulable appendage of the articulated device, wherein the articulable appendage is moveable relative to a main body, the main body comprising a camera system for digitally capturing an image; articulating the articulable appendage such that the directional light reference is at about a subject location, wherein the directional light reference is positioned to reflect light to the camera system at an angle at a plane substantially the same as the subject is at the subject location; focusing on a predefined area of the directional light reference; obtaining an image of the predefined area; and processing the image of the predefined area to obtain the white balance information at the subject location.

In one or more embodiments, an articulating device includes a main body including a camera system configured to capture an image of a subject; at least one articulable appendage coupled with and extendable relative to the main body, the least one articulable appendage comprising a flat planar surface having thereon a directional light reference; and a control system configured to extend the at least one articulable appendage to about a subject location, wherein the directional light reference is positioned to reflect light to the camera system at a plane substantially the same as the subject is at the subject location.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION DRAWINGS

The accompanying drawings are included to provide a further understanding of the invention, and are incorporated in and constitute a part of this specification. The drawings illustrate embodiments of the invention and, together with the description, serve to explain the principles of the invention.

Figure 1:
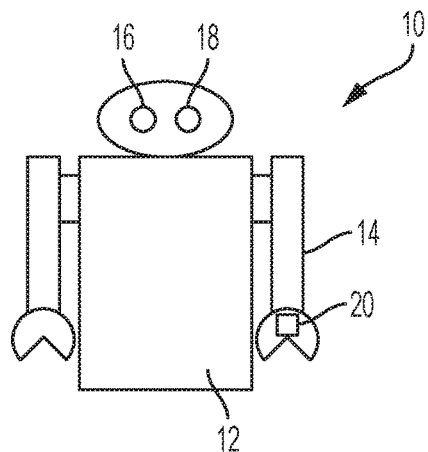
FIG. 1 illustrates an exemplary articulating device in the form of a personal robot including at least one articulable appendage coupled to a main body, wherein the at least one articulable appendage includes a directional light reference.
Figure 2:
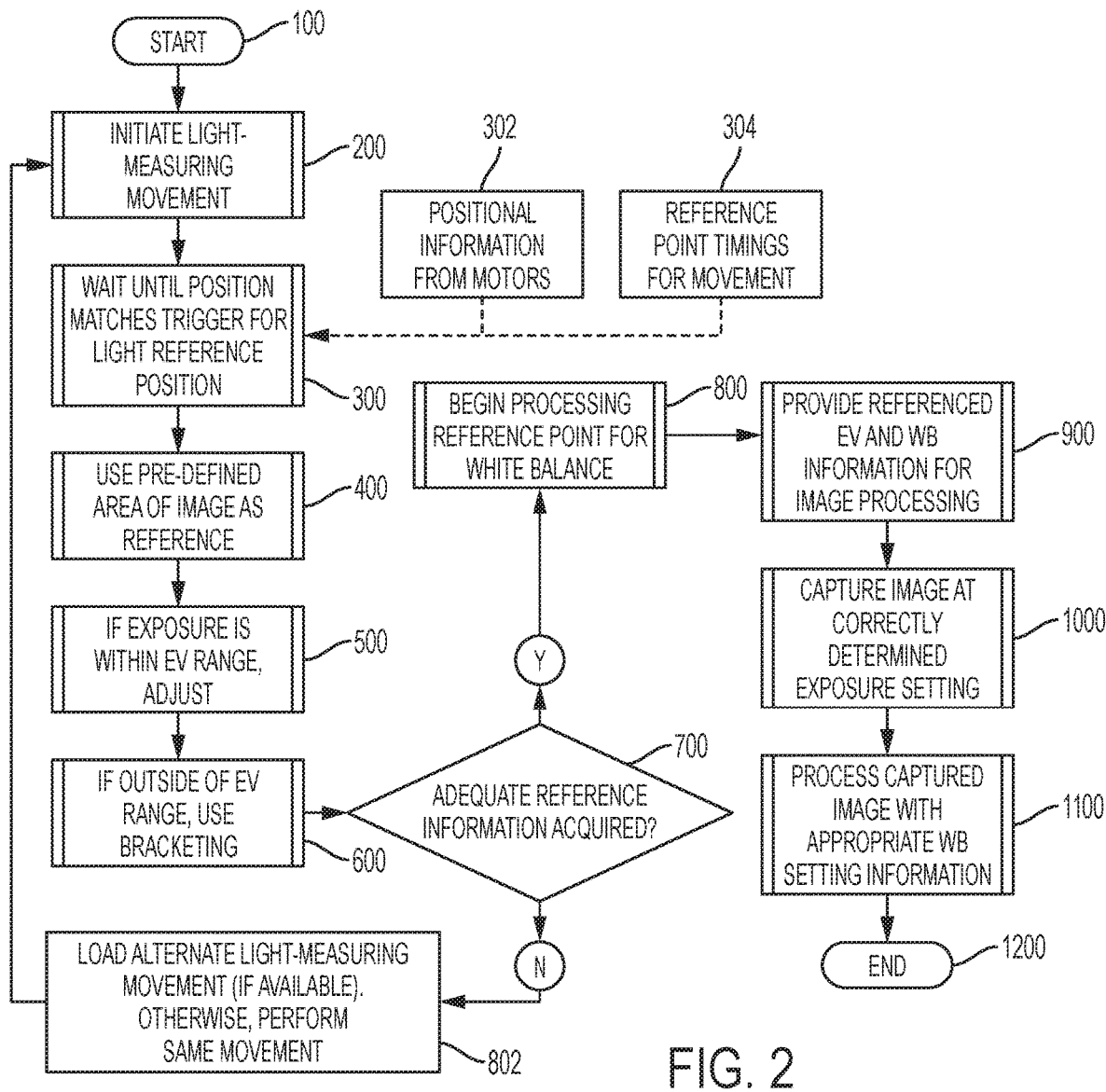
FIG. 2 is a flow chart of the steps of a method for obtaining photographic images with the articulating device.

It will be appreciated that for simplicity and clarity of illustration, elements shown in the drawings have not necessarily been drawn to scale. For example, the dimensions of some of the elements may be exaggerated relative to other elements for purpose of clarity.

DETAILED DESCRIPTION

Articulating devices and processes for obtaining photographic images with the articulating device generally include providing the articulating device with a directional light reference for use in photographically obtaining an accurate rendition of a subject being photographed. As will be described in greater detail below, the information obtained from the directional light reference and the camera system in the articulating device can be used to provide photographic images with enhanced detail and dynamic range similar to that of the human eye. The directional light reference can be a flat object of a neutral gray color that derives from a flat reflectance spectrum such as a digital gray card as the lighting reference, i.e., white balance card, or the like and is integrated onto a planar surface of an articulable appendage of the articulating device such that the lighting reference can be quickly positioned at the subject image location by the articulating device prior to taking the subject image picture quickly and without distracting the subject. Positioning can be effected by articulation of the appendage to the subject location, movement of the articulating device to the subject location, or combinations thereof.

The articulating device is not intended to be limited and generally includes at least one articulating appendage extending from a base (i.e., body) and a camera system mounted and/or integrated into the base. The base generally includes a body portion including the at least one articulable appendage coupled thereto, an optional head portion, optional legs or wheels, and the like to provide the articulating device with movement capability from one location to another. For most subject images, the camera system and the at least one articulable appendage will be at an elevated location relative to ground, e.g., at a location equivalent to a head portion. Moreover, it should be apparent that the camera system can be mounted and/or integrated anywhere within the base so long as there is an unobstructed view of the subject. For convenience and ease in understanding the present application, reference will be made to a personal robot including a head and at least articulating arm extending from an elongated body in a manner and location similar to that of a human.

An exemplary articulating device in the form a personal robot designated by reference numeral 10 is depicted in FIG. 1, and as noted above, generally includes a main body 12 and at least one articulable appendage 14. The at least one articulable appendage 14 is movable relative to the main body 12. The main body 12 further includes one or more camera systems, e.g., 16, 18, positioned to have a field of view generally directed forward. A directional light reference 20, e.g., a digital gray card, is provided on the planar surface of at least one of the articulable appendages. One or more of the camera systems may be configured to capture images and/or video of the robot environment for navigating the robot 10 and/or performing specialized tasks including, inter alia, photographic imaging of a subject. The robot 10 can include a drive system (not shown) designed to move the robot about in a variety of environments.

In one or more embodiments, the robot 10 includes a controller in communication with the at least one articulable appendage, the camera system for taking photographic images of a subject, and the drive system, if present. The controller may issue commands to one or more motors to move the articulable appendage, to position the robot from one location to another, and to take photographic images in accordance with the present invention, for example. The controller may also include one or more computer processors and associated memory systems as is generally known.

Likewise, the camera system for taking photographic images in accordance with the present invention is not intended to be limited and will generally include an electronic image capture unit mounted in the main body 12 of the articulating device 10. The camera system includes one or more lens and an electronic array image sensor aligned with the lens. In practice, light from a subject propagates along an optical path through the lens and strikes the image sensor producing an analog electronic image. The type of image sensor used may vary, but typically one of the several solid-state image sensors available. For example, the image sensor can be a charge-coupled device (CCD), a CMOS sensor (CMOS), or charge injection device (CID). A typical image sensor is accompanied by separate components that act as clock drivers (also referred to herein as a timing generator), analog signal processor (ASP) and analog-to-digital converter/amplifier (A/D converter). Such components can also be incorporated in a single unit with the image sensor. For example, CMOS image sensors are manufactured with a process that allows other components to be integrated onto the same semiconductor die.

The electrical signal from each pixel of the image sensor is related to both the intensity of the light reaching the pixel and the length of time the pixel is allowed to accumulate or integrate the signal from incoming light. This time is called the integration time or exposure time. Integration time can be controlled by a shutter that is switchable between an open state and a closed state. The shutter can be mechanical or electromechanical or can be provided as a logical function of the hardware and software of the electronic image capture unit. For example, some types of image sensors allow the integration time to be controlled electronically by resetting the image sensor and then reading out the image sensor some time later. When using a CCD, electronic control of the integration time of the image sensor can be provided by shifting the accumulated charge under a light shielded register provided at a non-photosensitive region. This can be a full frame as in a frame transfer device CCD or a horizontal line in an interline transfer device CCD. Suitable devices and procedures are well known to those of skill in the art. Thus, the timing generator can provide a way to control when the image sensor is actively recording the image.

The combination of overall light intensity and integration time is called exposure. Equivalent exposures can be achieved by various combinations of light intensity and integration time.

As used herein, a digital gray card is a middle gray reference that is often used by photographers to produce consistent image exposure and/or color in film and photography. The digital gray card is a flat object of a neutral gray color density that derives from a flat reflectance spectrum. As will be discussed in greater detail, the digital gray card can be integrated onto a planar surface of the extended robot appendage and can be used to provide a directional light reference point that is positioned in close proximity to the subject image location to set a white balance point, i.e., a color balance point that takes into account the color temperature of the light source, for a particular image set and all images captured thereafter.

By using the available information about a robot's movements, and specifically, where a calibrated digital gray square will be at a specific time/place during a pre-programmed movement, it is herein possible to greatly improve the image quality of portraits taken by articulating devices without needing any additional hardware or human intervention, which provides superior image quality especially in difficult lighting conditions over other auto-exposure methods that are commonly utilized with articulating devices having camera systems.

There are two forms of light used in photographic imaging systems: reflected light and incident light. Many commercial camera systems measure purely reflected light, which is a measurement of the light that originated at one or more sources of light (window, overhead lamp, camera flash, etc.) that is then reflected off the subject being photographed prior to reaching the observer or camera. Existing reflected light solutions largely rely on trial-and-error using techniques such as exposure bracketing and image detection, where a separate process will look for something in the relative shape of the subject, and refine the exposure from there. These methods can only produce a best guess effort, however, because there is no way to tell if the subject is pure gray under a slightly yellow (warm) light, or slightly yellow under a pure white light. Additionally, without a reference, the image processor cannot tell the difference between an object that is dark because it is naturally dark versus an object that is dark because of poor lighting. Its best guess is to adjust exposure until it is "gray", which is often not an accurate representation and is still largely trial-and-error in nature.

A fairly popular and well known example of an autonomous robot that has to make decisions on how to expose for unknown lighting conditions is the Mars Exploration Rover (MER). This particular robot has a total of 10 cameras, which help navigate the MER over the terrain of Mars, with its two main front-facing "eyes" being housed in a so-called Pancast Mast Assembly. Since the robot's main purpose for imaging is to keep it from falling into holes, finding the safest route from one spot to the next, and taking pictures to send back to Earth for scientists to study, its cameras are programmed with an algorithm to extract the most amount of data from an available scene. It is largely a trial-and-error method, though performed at such a high-speed that it does not contribute to the rover's latency. Put simply, camera system generates a histogram of details found at various exposure settings and shifts the exposure setting until it is gathering the greatest amount of detail. This is very similar to what an automatic point-and-shoot camera does, though the MER imaging system also allows for manual operation of its exposure program, should an engineer want to capture an image for a purpose other than strictly collecting data.

In contrast, incidental light measures the light hitting the subject prior to the light being reflected and reaching the observer or camera. For portraiture and some other forms of photography, an incidental light reading is greatly preferred as the amount of reflected light does not take into consideration the coloring of the object or subject being photographed. In other words, incident light is the light that falls on a subject, whether it comes from a direct or indirect source.

As an example of the practical differences between the use of reflected light compared to incident light when taking a photographic image, a subject with dark skin will reflect less light than someone with light skin, and a camera that can only measure reflected light will set exposure values differently compared to measuring incident light, which can produce markedly different images with the reflected light being a less accurate representation. Even with intelligent scene detection, which is often a feature of current point and shoot camera systems, where a camera can detect or be programmed that a subject image is of a human's face, it will still base its exposure on the reflected light emitted from that person's face, presenting the same problem. However, when incidental light is used as a reference measurement, the photographer can be assured that the subject image captured by the camera system will be a true representation of the shade and color of the subject, and not the camera's attempt to create something safely average as defined by the cameras processing algorithms for the particular subject setting, e.g., portrait, landscape, beach, fireworks, moving subjects, and the like.

Professional photographers typically measure incident light with light meters, which electronically determine the ideal exposure and white balance point for a specific point of view. These devices are very helpful, and would prove to be an ideal solution were they not so large and typically expensive. Moreover, integrating a light meter into an articulating device such as a robot would likely add cost, bulk, and cause a loss of dexterity. Providing a direct light reference onto a planar surface of an articulable appendage is of minimal cost, easily integrated, and provides improved accuracy relative to the trial and error techniques utilized in articulating devices configured to use reflected light for image processing.

Articulating devices such as robots can be highly precise in their movements, and as such, can carry out a movement or a reaction that may seem natural and fluent, while still being calculated down to the millisecond in time, and millimeter in movement. This is beneficial because many robots need to operate within a specified and limited area without interfering with the surrounding landscape, e.g., store displays, doors, other robots, or the like. The present invention takes advantage of the programmed movements of the robot, and the fact that the location and time are known parameters such that one can quickly and consistently obtain a direct light reference for the available light that is illuminating a subject to be photographed. The benefits are threefold. First, the robot is able to obtain a direct light reference reading such that the images the robot uses will be exposed and colored correctly for that exact lighting condition. Secondly, the reading will take place in a way that may not be noticed by the subject, thereby maintaining the illusion of the robot being thoughtful and cognitive, and third, the method of photographically obtaining an accurate rendition of the subject requires no additional hardware. Instead, only a relatively small flat area on one of the robot's articulable appendages is used, wherein a directional light reference is provided on the small flat area. The size of the directional light reference will generally depend on the resolution provided by the camera system.

When implemented, the robot gains additional functionality which allows for the operator to program a series of movements that incorporate the measuring of the reference spot that can then be used to set a white balance point, i.e., color balance point, for a particular image and all images captured thereafter at that location. The act of measuring the reference spot is performed shortly before a photographic image of the subject is taken, and can be done in such a way that does not distract or take-away from the experience. When in use around subjects, the subject or operator of the robot are not required to do any additional tasks in order to initiate this feature beyond what would normally be required to start a "picture-taking" behavior. Moreover, the robot can be moved into position such that extension of the articulable appendage can provide a measurement of the reference spot at the particular subject location.

In this manner, the robot programmer knows or can determine ahead of time exactly when and where the reference spot should be measured during the robot's movement. This can be set during programming by stepping through the range of motions and isolating a single frame and then selecting the spot. This point can then be saved as a reference, along with other information about the particular movement, which can be leveraged by any other user who is using that particular movement. Once set, using the reference spot in a programmed movement can obtain the incident lighting reference quickly, therefore eliminating problems associated with backlighting, high-contrast lighting, and other situations that may confuse a digital camera's image processor.

This solution is unique to highly-articulated and precise robots, which can take advantage of a tightly-controlled range of motion. In these systems, one instance of a movement is not only visually identical from the next, but we can leverage this feature to reliably obtain information about the environment that the robot is in without the need for additional hardware. The constant of the reference spot, a flat area with a medium-grey color, with the known location of that spot during the timeline of a movement, enables the articulating device to obtain a light reference similar to the way a photographer uses a digital grey card, only with the added benefit of the measurement being integrated into an existing movement, like waving to a subject who wants their picture taken, or who needs to be identified with facial recognition.

In one or more embodiments, a reference spot will be provided on a flat surface of the appendage, typically the back of its "hand" or arm. It should be apparent to those skilled in the art that the higher the resolution of the camera, the smaller the spot can be, but it needs to be sufficiently flat, evenly colored/shaded, and placed at the reference spot such that it reflects light at an angle similar to the same plane that the subject will be situation. For example, if the directional light reference were pointed up towards the ceiling, a false reading could be obtained from an overhead light, when the light that most affects the picture is coming from behind the robot.

In one or more embodiments, the robot can be configured to access a referenceable time and position for where to find the reference spot during its movement. By way of example, a programmer can use a timeline viewer/editor, common to most robotic programming software, to modify the available motions. By selecting a portion of a movement where the reference spot is plainly visible, and in close proximity to where the subject will be, for example, waving or giving a high-five, they can identify a time (key frame) and space (area of the image from the built-in camera) to quickly and programmatically obtain the necessary lighting reference.

FIG. 1 provides a flow chart detailing the process for obtaining photographic images with an articulating device using a directional light reference. The process begins at step 100, wherein the articulating device, e.g., robot, is initiated. As noted above, the articulating device generally includes a body portion including a camera system and at least one articulable appendage coupled to the body portion. The photographic imaging process generally begins with initiating light measurement movement with the articulating device as indicated at step 200.

In step 300, the articulating device waits until the position matches a predetermined location at which point it provides a trigger for the direct light reference. Positional and/or time information can be gathered in steps 302 and 304.

In step 400, once the direct light reference is at the triggered location, the camera system can be configured to utilize a pre-define area of the direct light reference, which as noted above is a flat neutral surface, e.g., a digital gray card, of the articulable appendage extending from the body portion of the robot.

In step 500, the camera is adjusted to the appropriate exposure value assuming the value is within a defined range. If outside the exposure value range as indicated in step 600, exposure bracketing at different brightness levels can be used. For example, shutter speed in the camera system can be increased and decreased to provide different brightness levels.

In step 700, a determination can be made as to whether the exposure value obtained from the direct light referenced provides adequate reference information. Once adequate reference information is acquired, processing of the reference point information can begin for white balancing. The camera will then read and lock in the color temperature of the light reflected from the direct light reference, e.g., gray card, and that locked-in reading now becomes the standard for the camera's white balance setting.

If adequate reference information is not provided as indicated in step 802, the process can be repeated until such time that adequate reference information is acquired. Optionally, an alternate light measuring movement can be initiated.

In step 900, the exposure value and the white balance information is then used for image processing.

In step 1000, a photographic image is then taken of the subject at the correctly determining exposure setting.

In step 1100, the captured image is then processed with the appropriate white balance setting information that had previously been obtained.

In low-light situations, it may be beneficial to ensure that the movement is not too fast where the shutter speed is too slow to catch the spot accurately. In these embodiments, the movement can be slowed down, or a backup movement can be used that is easier to measure. Again, because the size of the reference spot, current shutter speed, and distance between the camera and reference spot are known variables, it is possible to interpolate if the current light and movement allows for an accurate measurement. For example, the default animation may be a waving of the hand, and the backup animation for low-light may be a high-five or thumbs up.

Once the image of the reference spot is obtained, the direct light reference data can be used to correctly expose and color any future images taken in the same location under the same lighting, and the information can be leveraged by the image processor for any number of image-based tasks.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

As used herein, the articles "a" and "an" preceding an element or component are intended to be nonrestrictive regarding the number of instances (i.e. occurrences) of the element or component. Therefore, "a" or "an" should be read to include one or at least one, and the singular word form of the element or component also includes the plural unless the number is obviously meant to be singular.

As used herein, the terms "invention" or "present invention" are non-limiting terms and not intended to refer to any single aspect of the particular invention but encompass all possible aspects as described in the specification and the claims.

As used herein, the term "about" modifying the quantity of an ingredient, component, or reactant of the invention employed refers to variation in the numerical quantity that can occur, for example, through typical measuring and liquid handling procedures used for making concentrates or solutions. Furthermore, variation can occur from inadvertent error in measuring procedures, differences in the manufacture, source, or purity of the ingredients employed to make the compositions or carry out the methods, and the like. In one aspect, the term "about" means within 10% of the reported numerical value. In another aspect, the term "about" means within 5% of the reported numerical value. Yet, in another aspect, the term "about" means within 10, 9, 8, 7, 6, 5, 4, 3, 2, or 1% of the reported numerical value.

It will also be understood that when an element, such as a layer, region, or substrate is referred to as being "on" or "over" another element, it can be directly on the other element or intervening elements may also be present. In contrast, when an element is referred to as being "directly on" or "directly over" another element, there are no intervening elements present, and the element is in contact with another element.

The flow diagrams of the figures depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

It will be understood that when an element, such as a layer, is referred to as being "on" or "over" another element, it can be directly on the other element or intervening elements may also be present. In contrast, when an element is referred to as being "directly on" or "directly over" another element, there are no intervening elements present.

While the present invention has been particularly shown and described with respect to preferred embodiments, it will be understood by those skilled in the art that the foregoing and other changes in forms and details may be made without departing from the spirit and scope of the invention. It is therefore intended that the present invention is not be limited to the exact forms and details described and illustrated but fall within the scope of the appended claims.

What is claimed is:

1. A process for taking a photographic image of a subject, the process comprising:
    articulating at least one articulable appendage coupled to a main body of an articulating device to a subject location, wherein the at least one articulable appendage comprises a flat planar surface having thereon a directional light reference, and wherein the directional light reference is at about the subject location;
    focusing on a predefined area of the directional light reference with a camera in the main body of the articulating device;
    adjusting an exposure value within a predetermined range to obtain a desired exposure value;
    obtaining an image of the predefined area of the directional light reference at the desired exposure value;
    processing the image of the predefined area of the directional light reference to obtain white balance information at the subject location;
    capturing an image of a subject at the subject location using the desired exposure value; and
    processing the captured image with the white balance information to obtain the photographic image of the subject,
    wherein the directional light reference is one of a digital gray card and a white balance card.

2. The process of claim 1, wherein obtaining the image of the predefined area comprises referencing positional information and time of movement of the at least one articulable appendage; and obtaining the image of the predefined area at about the subject location based on the positional information and time of movement.

3. The process of claim 1, wherein when the desired exposure value falls outside the predetermined range the process further comprises bracketing by taking multiple images of the predefined area of the directional light reference at different exposure values; and selecting the desired exposure value from the different exposure values.

4. The process of claim 3, further comprising repeating the step of adjusting the exposure value associated with the predefined area to obtain the desired exposure value if the desired exposure value is not obtained by the bracketing.

5. The process of claim 1, wherein the directional light reference is on a planar surface at a distal end of the at least one articulable appendage.

6. The process of claim 1, wherein articulating the at least one articulable appendage positioned the directional light reference to reflect light to the camera system at an angle at a plane substantially the same as the subject is at the subject location.

7. The process of claim 1, wherein articulating at least one articulable appendage is integrated with an existing programmed movement of the articulating device.

* * * * *